United States Patent
Benz et al.

(10) Patent No.: US 7,623,222 B2
(45) Date of Patent: Nov. 24, 2009

(54) SINGLE-CHANNEL HETERODYNE DISTANCE-MEASURING METHOD

(75) Inventors: Paul Benz, Diepoldsau (CH); Jürg Hinderling, Marbach (CH); Martin De-Lang, Kesswil (CH)

(73) Assignee: Leica Geosystems AG, Heerbrugg (CH)

( * ) Notice: Subject to any disclaimer, the term of this patent is extended or adjusted under 35 U.S.C. 154(b) by 229 days.

(21) Appl. No.: 11/721,977

(22) PCT Filed: Dec. 9, 2005

(86) PCT No.: PCT/EP2005/013242

§ 371 (c)(1),
(2), (4) Date: Jul. 10, 2007

(87) PCT Pub. No.: WO2006/063740

PCT Pub. Date: Jun. 22, 2006

(65) Prior Publication Data

US 2008/0304043 A1    Dec. 11, 2008

(30) Foreign Application Priority Data

Dec. 18, 2004    (EP) .................................. 04030085

(51) Int. Cl.
*G01C 3/08*    (2006.01)
(52) U.S. Cl. ...................... 356/5.09; 356/5.01; 356/5.1; 356/4.1

(58) Field of Classification Search ................. 356/5.09
See application file for complete search history.

(56) References Cited

U.S. PATENT DOCUMENTS

| 5,347,525 | A | * | 9/1994 | Faris ........................... 372/19 |
| 5,428,439 | A | | 6/1995 | Parker et al. |
| 5,889,490 | A | | 3/1999 | Wachter et al. |
| 2004/0085526 | A1 | * | 5/2004 | Gogolla et al. ............. 356/4.01 |

FOREIGN PATENT DOCUMENTS

| DE | 101 12 833 | 3/2003 |
| EP | 1 450 128 | 8/2004 |

* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

According to the invention, high precision distance measurement may be carried out by the broadcast of pulsed electromagnetic radiation (ES) with at least two pulse repetition frequencies, whereby the pulse repetition frequencies are selected such that the corresponding pulse separations do not have a common multiple in the range of the order of magnitude of a maximum external measurement range. The radiation is hence transmitted both to a target for measurement over the measurement path outside the device and also over a reference path inside the device, whereby the radiation (IS) passing along the reference path defines at least one start pulse and the radiation (ES) passing along the measurement path defines at least one stop pulse.

21 Claims, 4 Drawing Sheets

SINGLE-CHANNEL HETERODYNE DISTANCE-MEASURING METHOD

BACKGROUND

The invention relates to a distance-measuring method, a distance measuring apparatus and a computer program product.

In the area of electronic distance measurement, various principles and methods are known, the two fundamental optoelectronic principles of measurement being embodied by phase meter and transit time meter. Both principles have advantages and disadvantages and are used in a multiplicity of geodetic devices. Thus, for example, the measuring means used in geodetic surveying, such as theodolites or tacheometers, are equipped mainly with phase meters since these have the advantage of high accuracy and compact design, which facilitates integration in a telescope.

In the phase measurement technique, light pulses (usually square-wave signals) are emitted with repetition frequencies in the range from a few MHz to a few hundred MHz. In addition to LEDs, conventional CW laser diodes having peak powers of a few mW can also be used as light sources for this purpose. The mean emitted energy is sufficiently high, and the visibility of the laser spot on the target is not a problem for the distances to be measured using phase meters.

For the distance measurement, the phase position of the emitted signal is compared with that of the returning signal. The phase shift is proportional to the measured distance. The RF signal received by a photodiode is amplified and is down-converted true to phase to a lower frequency band with the aid of a phase locked loop (PLL)-controlled local oscillator signal.

Instead of high-frequency signal sampling with sampling rates in the GHz range, it is substantially easier to employ a low-frequency receiver signal. Here, the sampling and analogue-digital conversion in the low-frequency (LF) range is simpler, more accurate and less current-consuming by orders of magnitude. In conventional phase meters, only the basic harmonic or the down-converted LF signal is used.

In order to extend the un-ambiguity of a phase-measuring system from the meter range into the km range, one or more coarse distance measurements with lower modulation frequencies are usually carried out in addition to the fine distance measurement.

For achieving sufficient absolute accuracy, an internal light path (calibration or reference path) and an external light path (measuring path) are usually measured in succession. In this way, changes in transit times can be calibrated in the electronics. The calibration of the transit time changes can also be realized by means of two identical, parallel receiving channels. Accurate distance measurement is possible in the case of phase meters only with 2 channels with high signal separation.

The advantages of the phase meter are in particular the simple design, the measurement at LF level and the reliable beam resources available.

The falsification of the measured distance by the superposition of signals due to the optical crosstalk proves to be disadvantageous, so that pronounced channel separation of high suppression is required. An accurate distance measurement therefore requires rigorous signal separation between transmitting channel and receiving channel, which is very difficult to achieve, complex and expensive in a telescope of compact design. In addition, only one target should be in the measuring beam, since otherwise errors in the coarse distance measurement can also occur in addition to fine distance measuring errors. For longer distances, both at least one coarse measurement and one fine measurement are required. Single-channel measuring principles, i.e. those without light path or channel switch, are not possible with the simple frequency concept.

Transit time meters do not have the disadvantage of rigorous signal separation but their accuracy of measurement is often insufficient for geodetic surveying, in particular if sub-mm accuracies are required.

In the case of rangefinders which operate according to this principle, a light pulse is likewise emitted, this light pulse being divided by suitable optical measures so that a part is passed via an internal light path (calibration path) directly to the receiver whereas the remaining component of the light is sent from the device via the external light path.

This external component strikes a target some distance away—the distance to be measured (=measured distance)—and is reflected back from there and passed via a suitable optical system to the same receiver, the receiver expediently being a photodiode with down-circuit amplifiers.

The light pulse passed via the internal light path produces in the receiver a reference pulse, which is referred to below as start pulse. The light pulse passed via the external light path (measured distance) produces in the receiver the so-called measured pulse, which is referred to below as stop pulse.

Since the length of the internal and the external light path are different, the two light pulses arrive at the receiver at different times. The time difference between start pulse and stop pulse is referred to as transit time and is proportional to the difference in length between internal and external light paths. The time differences to be measured are very small, i.e. they must be determined extremely accurately in order to arrive at a geodetic accuracy of mm or sub-mm suitable for a usable distance measuring system. For determining transit time, at least the received signal is digitized, for which purpose very complicated high-frequency electronic circuits with sampling rates in the GHz range are required.

Further light pulses are emitted by the transmitter only after the stop pulse has arrived at the receiver. This requires a relatively low pulse repetition frequency of a few 10 kHz in order to be able to ensure an unambiguity of a few km. In order to be able to emit sufficiently great light energy at such a low pulse repetition frequency so that the laser spot is readily visible or so that it is possible to go to the limit of eye safety (laser class 2), the peak power must be in the range from several 10 W to 1 kW depending on pulse width.

Advantages of the single-channel transit time measurement are the absence of time drift because start and stop pulse take place shortly in succession and are subject to the same transit times, the insensitivity to optical crosstalk because the stop pulse takes place only after the crosstalk pulse, and the omission of the unnecessary switchable optical components for the internal and external light path.

However, the disadvantages of the transit time measurement are in particular the very complicated sampling and the time measurement of the RF signals and the complicated beam sources, which are also difficult to handle (e.g. microchip lasers with quality modulation). Semiconductor laser diodes having high peak power have a disadvantageously extensive illumination area, and the radiation can be focused or collimated only to an insufficient extent. The laser beam can be focused to a quasi-parallel pencil with sufficiently small divergence only with sufficiently spatially coherent point light sources which emit from a diffraction-limited, small area. The semiconductor laser diodes which emit from such a diffraction-limited small area and can therefore be focused to a beam with sufficiently small divergence have to date a peak transmission power which is limited to a few hundred mW and is therefore much too low for a pulse transit time meter.

Although various arrangements which manage without channel separation and light switching are known, all solutions are associated with various disadvantages.

A method and an apparatus for optoelectronic distance measurement according to the phase measurement principle are described in the document DE 100 06 493 C2. The phase meter is equipped with a 2-channel receiver without mechanical light path switching, the circuit being equipped with 2 photoreceivers. In a distance measurement, in each case the signal phases are measured at the first and at the second receiver. The measured phase at the first receiver describes the distance of the internal reference light path, and the phase at the second receiver describes the distance to the target object. The difference between the two phases gives the drift-free absolute distance based on the reference light path. With a second transmitter, any phase difference produced via the 2 photo receivers and the amplification circuits thereof can be simultaneously measured. Disadvantages of this solution are both the two transmitting units and the two photoreceivers, which result in a more complex construction, and the interleaving of the two light paths by means of two elements for beam combination for each of the two photoreceivers.

A second arrangement is described in the document U.S. Pat. No. 6,369,880. The phase meter disclosed there is equipped with a 2-channel receiver without mechanical light path switching and with two photoreceivers. In a distance measurement, in each case the signal phases at the first and at the second receiver are measured, the difference between the two phases corresponding to the measured distance. A disadvantage of this solution is likewise the duplication of the photosensitive and phase-sensitive receiving unit.

WO 03/069779 describes a transit time meter having a 2-channel receiver without mechanical light path switching so that the reference measurement principle free of optical switching was realized in the case of transit time meters too. However, the transit time meter disclosed likewise uses 2 photoreceivers. The signals of the 2 receivers are fed to a time-measuring unit operating in the high frequency range. In a distance measurement, the difference between the internal and external transit times measured in parallel is calculated. This solution, too has the disadvantage of the duplication of the receiving unit.

Thus, the solutions of the prior art require a switching mechanism between external and internal light path or a duplication of the receiving system and are therefore expensive and complex in terms of design.

DE 101 12 833 C1 describes a method and an apparatus for electrooptical distance measurement which is intended to combine the advantages of a phase transit time method with those of a pulse transit time method, high peak light powers, i.e. a good signal/noise ratio, being of primary interest in the case of the latter. For the electrooptical distance measurement, the laser beam of an emitter diode is sent as an intensity-modulated sequence of transmitted light pulses to a target plate-free measured object, and the measuring light pulses reflected there are detected by a light detector, by which a first photocurrent component is generated. In addition, a small fraction of the intensity-modulated transmitted light pulse sequence is branched off as a reference light pulse sequence and, after passing over a known reference path, is likewise passed to the light detector, with the result that a second photocurrent component is produced. The light detector used is an avalanche photodiode in which the superposed measured light pulses are directly converted with a mixer pulse sequence produced by a local oscillator into a comparatively low intermediate frequency range, from which the measured distance can be determined after appropriate conversion.

A difficulty of this approach is that start pulse and stop pulse may overlap so that, in this case, separation or assignment of the pulses is not possible. Because the number of harmonics used is 20, frequencies into the gigahertz range are necessary. A reduction of the harmonics used would lead to broad pulses, which in turn increases the probability of pulse overlap.

An object of the invention is to provide a method and a device for distance determination with reduced complexity and technical effort, respectively.

A further object of the present invention is to combine advantages of phase and transit time principles without having to accept disadvantages thereof, and in particular to permit the separability of pulses.

SUMMARY

The invention provides both a novel distance-measuring principle and an apparatus consisting of a transit time measuring unit and a simple optical transmitting and receiving unit without particular channel separation between the two beam paths. The distance-measuring apparatus can be installed, for example, in telescopes as is customary in the case of geodetic surveying instruments. Distances are measured to natural objects as well as to reflective target plates, such as retroreflectors.

The basis is a distance-measuring principle where joint or parallel measurement of two transit times, in particular the transit times of an external and of an internal light signal. Joint or parallel measurement is understood as meaning the linked recording of two pulses which are resolved with respect to time and are close together. Thus, the terms "joint" or "parallel" do not require any stringent concurrence in the sense of strict simultaneity but only coherence of the pulse measurement with respect to time or a direct relationship with respect to time during the measuring process. The difference between the two transit times is output as the actual measured variable. In order to realize the strived-for distance measurement accurate at the mm or sub-mm level, a reference distance, which is usually formed by an internal reference light path, is therefore furthermore used. According to the invention, the switching between two light paths can be dispensed with.

The signals are passed simultaneously both via a light path inside the device and via the external light path to be measured, to a common, in particular single, photodiode, so that a measuring channel is defined thereby, the determination of the transit time between the two signal pulses constituting a challenge. The object is additionally complicated since the laser pulse frequencies are in the range from a few MHz to GHz. A plurality of light pulses, in the extreme case up to more than 100 light pulses, are therefore simultaneously under way along the external light path to be measured. The invention therefore also relates to an approach which makes it possible to determine the number of light pulses in the external light path, although no coding is used for identification of laser pulses. The modulation frequencies associated with this principle were customary to date only in the case of phase meters.

The principle on which the invention is based furthermore combines the advantages of transit time measurement with those of phase measurement. In principle, the approach resembles a single-channel pulse transit time meter. Instead of high-frequency sampling of the signal using sampling rates in the GHz range (as in the pulse transit time meter), however, the high-frequency received signal with start pulse and stop pulse is simultaneously converted down true to phase to a lower frequency band (as in the phase meter).

An RF pulse signal, for example one produced by a PLL-controlled local oscillator, can be used as a mixer signal. In the 1-channel heterodyne system according to the invention, in contrast to the phase meter, all harmonics are therefore concomitantly used. A time-dilated image of the high-frequency start and stop pulse in the LF range results. The choice of the factor for an expedient time dilation is dependent in each case on the pulse frequency of the transmitter. For example, a dilation factor of 1 MHz/(1 MHz/128)=128 is sufficient in the case of a pulse frequency of 1 MHz, whereas a dilation factor in the region of 500 MHz/(1 MHz/128)=64 000 is required in the case of a pulse frequency of 100 MHz.

With the aid of low-frequency sampling ($\leq$1 MHz) of the LF signal, the spacing of start and stop pulse can be easily measured; it is proportional to the measured paths to be determined.

The advantages of the 1-channel heterodyne system according to the invention can be formulated as follows:

a) No switchable optical components for the internal and external light path are necessary.

b) The arrangement is insensitive to crosstalk. The crosstalk can, for example, even represent the start pulse. In addition, the stop pulse can be chosen by a suitable choice of the pulse rates so that it does not take place simultaneously with the crosstalk pulse.

c) The evaluation of the received signal can be realized on the basis of the time dilation in the low-frequency range. All time-related measurement errors are reduced by the dilation factor.

d) Since start pulse and stop pulse are fed via the same transmitting and receiving electronics, their signal transit time is irrelevant and does not influence the distance measurement.

e) A significant time drift is not present. Start pulse and stop pulse take place shortly in succession and are subject to the same internal and external transit times.

f) Owing to the high pulse frequencies and hence correspondingly low optical peak powers, it is possible to use cw semiconductor lasers with good focusing properties.

g) If the laser emits visible radiation, the average optical power is sufficiently strong, owing to the high laser pulse frequency, in order to produce a clearly detectable light spot on the target object.

Specific further developments of the 1-channel heterodyne system according to the invention are possible, for example, by the following measures:

a) Owing to the high repetition frequency, the stop pulse coincides with a start pulse at many distances, so that the two pulses strongly influence one another and cannot easily be separated from one another. However, for each measured distance, it is possible to find or select pulse frequencies at which the stop pulse occurs in a gap between the start pulses.

b) For the coarse distance determination, frequencies located close together are evaluated, similarly to the phase meter. Owing to the limitation under a), however, it is not always possible to make arbitrarily small frequency steps which would permit reliable but inaccurate measurement under poor conditions.

Owing to the high pulse repetition frequency, the stop pulse coincides with a subsequent start pulse at a distance of only 1 to 10 m. Thus, more than just one light pulse is underway from this distance. As in the phase measurement, the problem now is to determine the number of pulses which are present between transmitter and receiver. The coincidence of a start pulse with a stop pulse constitutes a particular problem. Depending on the respective frequency concept, this collision occurs at many distances or only at a few distances. If two pulses are located one on top of the other or touch one another, there is a mutual influence, in particular with respect to the transit time. In this case, it is no longer possible to separate the pulses sufficiently precisely from one another, and a time measurement with sufficient accuracy is not achievable.

By an optimized choice of pulse repetition frequencies, the unambiguity range and hence measuring range of a 1-channel heterodyne system can be extended beyond a pulse period $T_i$ or a pulse interval $L_i=(c/2)\cdot T_i$. C denotes the velocity of light. In the case of transit time meters to date, the longest pulse interval $L_i$ corresponds to the maximum unambiguity range and would be only 1 to 10 m at the high pulse frequencies.

According to the invention, the distance is measured with at least two different pulse repetition frequencies, in the case of a larger desired unambiguity range with a plurality of different pulse repetition frequencies, in order to extend the unambiguity range. On the basis of the received signal shape, it is possible to decide which of the pulse repetition frequencies have undisturbed stop pulses and are therefore suitable for the time measurement. The received signal shape can be used when the two signal pulses, i.e. start and stop pulses, are present separately side by side. If, on the other hand, they touch one another or are even located one on top of the other, the received signal may be useless for an evaluation.

To make it possible to work with as few frequency switching operations as possible or as few useless frequencies as possible, the pulse intervals thereof can advantageously be chosen according to the principle of number theory for avoiding a common multiple in the distance range.

For the practical case, this means choosing the frequencies or pulse intervals $L_i$ and $L_j$ so that the stop pulses coordinated with the different frequencies may be close together but are not permitted to overlap. Thus, if two stop pulses are adjacent to the frequencies with pulse intervals $L_i$, $L_j$ $$|N_i \cdot L_i - N_j \cdot L_j| < \tfrac{1}{2} \cdot \min(L_i, L_j) \quad (1)$$

they should not touch one another in the desired unambiguity range $D_{max}$ or at least should touch one another at as few pulse intervals $L_i$, $L_j$ as possible:

$$N_i \cdot L_i < N_j \cdot L_j - 2 \cdot \text{pulse width if } N_i \cdot L_i \leq N_j \cdot L_j$$

$$N_i \cdot L_i > N_j \cdot L_j + 2 \cdot \text{pulse width if } N_i \cdot L_i \geq N_j \cdot L_j \quad (2)$$

in particular for the distance range:

$$N_i \cdot L_i < D_{max} \text{ and } N_j \cdot L_j < D_{max} \quad (3)$$

The variables $N_i$, $N_j$ denote integral positive numbers and typically comprise the natural numbers up to 500.

The requirement (2) can, however, scarcely be fulfilled over the entire distance range according to equation (3), owing to the limited frequency bandwidth of the synthesizer (for example 33 MHz+/−5 MHz). A group or set of frequencies or pulse intervals $L_i$, $L_j$ can be regarded as being optimal if the frequency set infringes the requirement (2) as little as possible (minimum principle). Of course, there are other known mathematical methods for fulfilling the requirement (2) as optimally as possible over the interval (3). Even in the case of more than one target object in the measuring beam, requirement (2) is still valid.

Instead of a static frequency set, it is also possible to use a flexible frequency strategy dependent on the respective measured distance. The set of laser pulse frequencies may comprise, for example, five specified frequencies and a freely selectable frequency. A coarse distance measurement is carried out with the five specified frequencies and then the precision distance measurement with an advantageously chosen laser pulse frequency, so that the start and stop pulse thereof do not overlap or touch one another. The adaptive frequency can be chosen, for example, so that the stop pulse falls between the first and third quarter of the pulse interval $L_i$:

$$|x_i| \in \{ 1/4 \ldots 3/4 \} \quad (4)$$

with $x_i$ (cycle) as the measured variable for the distance between start pulse and stop pulse, divided by the interval $L_i$.

The distance sought is then calculated as follows:

$$D = N_i \cdot L_i + x_i \cdot L_i \quad (5)$$

with the measured variable $x_j$ as the cycle in the interval $L_i$ and $N_i$ as the number of laser pulses in the distance range.

There are several numerical methods for solving the ambiguity $N_i$, i.e. the number of transmitted pulses between instrument and target object. Thus, various suitable methods are known from radar or GPS satellite surveying technology. The methods of difference calculation and of linear combination (LC), in particular narrowlane LC or widelane LC, may be mentioned here by way of example.

Where the coordinated, synthetic pulse interval $L_w$ of a widelane LC surpasses the unambiguity range $D_{max}$, $N_w=0$ and the ambiguity $N_i$ can be solved immediately for all frequencies or pulse intervals $L_i$ for this LC with the coordinated pulse interval $L_w$.

$$N_i = \langle x_w L_w / L_i \rangle \quad (6)$$

The brackets denote rounding to the next lowest integer. Of course, other methods are known to the person skilled in the art.

A further development permits the accurate determination or precise measurement of the transit time difference or cycle $x_i$ between start pulse and stop pulse in the pulse interval $L_i$. The signal pulses (time signal) are stored in a memory as data samples at discrete time intervals. The time resolution or, more accurately, the distance resolution from sampled value to sampled value is typically 10 mm to 100 mm. In order to achieve a sub-mm resolution, a time interpolation between the sampled values is therefore necessary. A method not only with high resolution but also with sufficient accuracy is the cross-correlation of the received signal pulse with a reference signal recorded prior to the measurement. The superposition of two reference pulses is cross-correlated with the digitized measuring signal. Interpolation is possible by supersampling of a reference signal as well as by a functional fit calculation.

In spite of the evaluation of the harmonics of the LF-transformed received signal, a large part of the time or distance information present in the original RF signal is lost through the time dilation of the received signal (start and stop pulse) The Nyquist criterion is therefore infringed unless at least two sampling pulses are present per period of the highest harmonic of the RF received pulses. This loss arises through the heterodyne principle in which, similarly to a subsampling system, RF received pulses are not met in between by a mixer pulse (=sampling pulse). The transit time information of these RF received pulses are not included in the heterodyne time or frequency transformation and therefore contribute nothing to the LF signal because they occur in the mixer gaps.

The minimal loss time expansion principle according to the invention now compensates for this loss of signal information by converting down the RF received pulses simultaneously and parallel with at least two, but preferably more, mixer pulse signals phase-shifted relative to one another to a plurality of separate LF signals. These several LF signals can now be summed at the correct phase and combined to give a single received signal. Because the noise contributions are not correlated in this parallel mixer system, the signal/noise ratio improves with the number of mixer channels.

The optimum number of mixer signals of different phase depends on the pulse duration and the pulse period $T_i$ of the high-frequency but band-limited received signals, in particular of the received signal with the highest frequency. The maximum number of mixer channels corresponds to twice the quotient of pulse period to pulse width (pulse duration). These several low-frequency signals emerging at the outputs of the mixer channels can now be summed with the correct phase.

BRIEF DESCRIPTION OF THE DRAWINGS

The distance-measuring apparatus or the distance-measuring method according to the invention is described in more detail or explained below purely by way of example with reference to working examples shown schematically in the drawing. Specifically.

DETAILED DESCRIPTION

Figure 1:
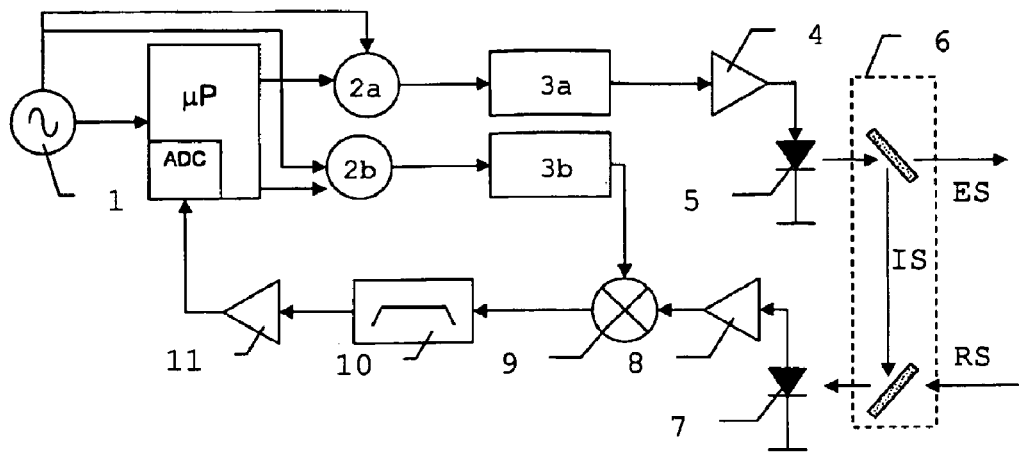
FIG. 1 shows the schematic block diagram of a first embodiment of the apparatus according to the invention.

The block diagram shown schematically in FIG. 1 and illustrating a first embodiment of the apparatus according to the invention shows the substantial building blocks of a 1-channel heterodyne system. A reference oscillator with crystal accuracy and with a typical clock accuracy of 0.5-5 ppm is present at the beginning of the signal chain. A so-called direct digital frequency synthesizer $2a$ is present in the transmission channel. Depending on the programming by the microcontroller or microprocessor μP, element $2a$ produces the desired frequency in the range of a few kHz or MHz.

The frequency converter $3a$ is likewise coordinated with the transmission channel and multiplies the frequency in higher ranges so that the measuring frequency $F_i$ results. In addition, the frequency converter $3a$ acts as a filter and ensures spectral signal purity. A driver stage 4 converts the control frequency to electrical pulses of short duration and drives the light source 5, such as, for example, a laser diode. A part of the light pulse is directed as an emitted signal ES onto the target object to be surveyed, and the other part is passed as internal signal IS via a beam splitter directly to the optical receiver. The arrangement 6 corresponds to the internal reference light path by means of which the respective start pulses are produced. In the simplest case of realization, the light scattered from the transmitter onto the optical receiver is sufficient as a reference light path; in this design, no beam splitter is necessary. The light pulses reflected by the target object and received are passed as reflected signals RS simultaneously or in parallel to the same optical receiver 7 and form the stop pulses.

The high-frequency start and stop pulses are subsequently sampled analogously via an amplifier 8 by an electronic mixer 9 of high bandwidth, which in turn is controlled by a high-frequency pulse signal but with a frequency slightly different compared with the transmitter channel. This is a subsampling with a time dilation effect true to phase. The time-dilated signal is available only at the output of the down-circuit low-pass filter 10. The mixer control signal is produced by a second sector of the synthesizer, this in turn consisting, for example, of a direct digital frequency synthesizer 2b whose frequency is controlled by the same microcontroller or microprocessor μP phase-true to the first frequency synthesizer 2a in terms of time.

The time-dilated received signal is digitized by an AD converter ADC with a sufficiently fast sampling rate in the kHz to MHz range and stored in the memory.

For each laser pulse frequency $F_i$, the time-transformed relative lag $x_i$ between the stop pulse and the start pulse is calculated in relation to the time-transformed pulse interval $T_i$ as a measured variable. The interpolation with respect to time between the sampling points is effected by the cross-correlation method or a functional fit method.

The solution of the ambiguity $N_i$, i.e. the number of light pulses between instrument and target object, is effected—as described above—for example by the method of calculating the difference between the measured values $x_i$. These values are coordinated with long pulse periods which are comparable with the length of the unambiguity range $D_{max}$. The ambiguity determination is therefore limited to a small search area with which the correct set of ambiguity parameters $N_i$ can quickly be found. The strategies relevant in practice for determining the ambiguity from the relative lags $x_i$ are known to the person skilled in the art, for example from the resolution of phase ambiguities in the GPS algorithm.

Figure 2:
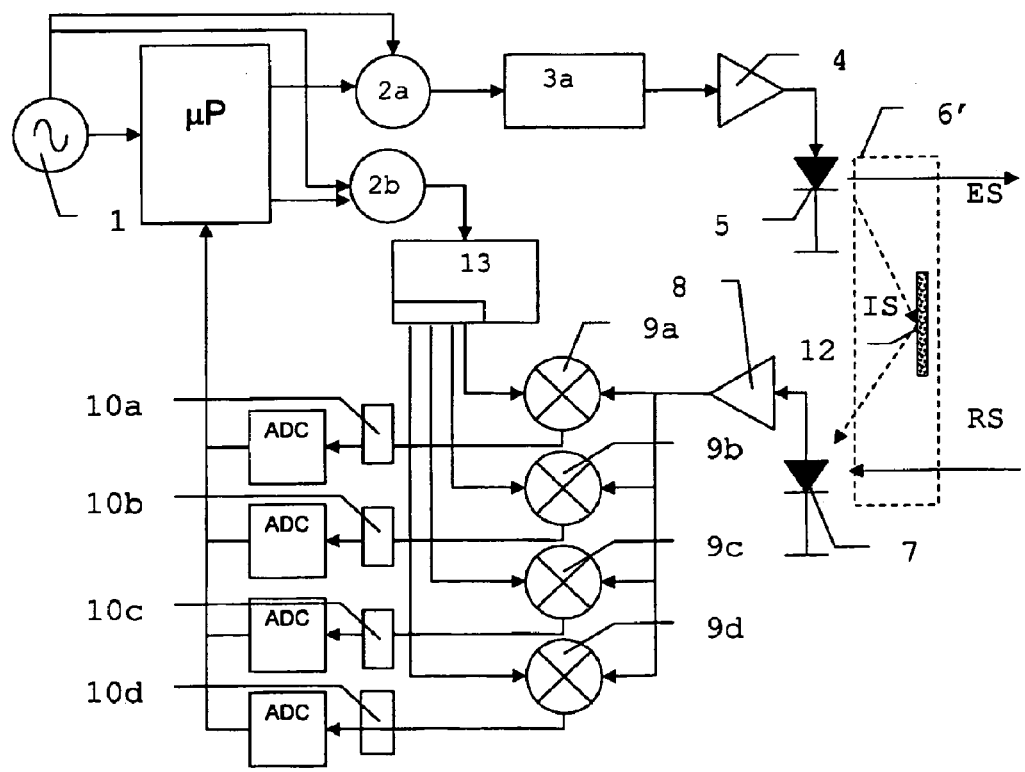
FIG. 2 shows the schematic block diagram of a second embodiment of the apparatus according to the invention, with increased sensitivity compared with a phase meter.

FIG. 2 shows a block diagram of a second embodiment of the 1-channel heterodyne apparatus according to the invention, with a substantially increased sensitivity compared with FIG. 1 and in particular with a phase meter.

Except for the heterodyne high frequency mixer stage, the assemblies correspond substantially to the working example shown in FIG. 1. However, the internal reference light path 6' is led via a reflective surface 12, by means of which the internal signal IS is passed to the optical receiver 7. Such a reflective surface 12 can be formed, for example, by the inside of the device housing, so that a defined reflection serves as internal signal IS.

With a plurality of mixer modules 9a, 9b, 9c, 9d arranged in parallel, the loss-associated effect of signal subsampling can be eliminated. In this extended apparatus, the frequency converter stage 13 produces, for example, four high-frequency control signal pulses which once again are slightly frequency-shifted relative to the transmission channel. The phases of these control signals are shifted relative to one another in integral steps of (2π/number of control signals).

The mixer modules 9a, 9b, 9c, 9d therefore also produce signals delayed by these phase steps, at their outputs coordinated with the low-pass filters in 10a, 10b, 10c, 10d. The time-transformed signals are digitized virtually simultaneously and are stored by the microprocessor μP in the memory. In another embodiment, the analog output signals can also be summed with the correct phase and digitized only thereafter.

The loss of signal/noise ratio which occurred through subsampling is eliminated in the course of post-processing, by cumulatively summing the digital signal pulse sequences in this example 4 with correct phase and in particular in integral steps of (2π/number of control signals) to give a single signal pulse sequence.

For each time-dilated, cumulative pulse frequency, the time-transformed relative lag $x_i$ between the stop pulse and the start pulse is calculated in relation to the time-dilated pulse interval as a measured variable analogously to FIG. 1. The interpolation with respect to time between the sampling points of the cumulative signal pulse signal is once again effected by the cross-correlation method, Fourier transformation or a functional fit algorithm.

The particularly advantageous properties of this distance-measuring apparatus are the measurement sensitivity comparable with a transit time meter and the accuracy of measurement comparable with a phase meter.

Figure 3:
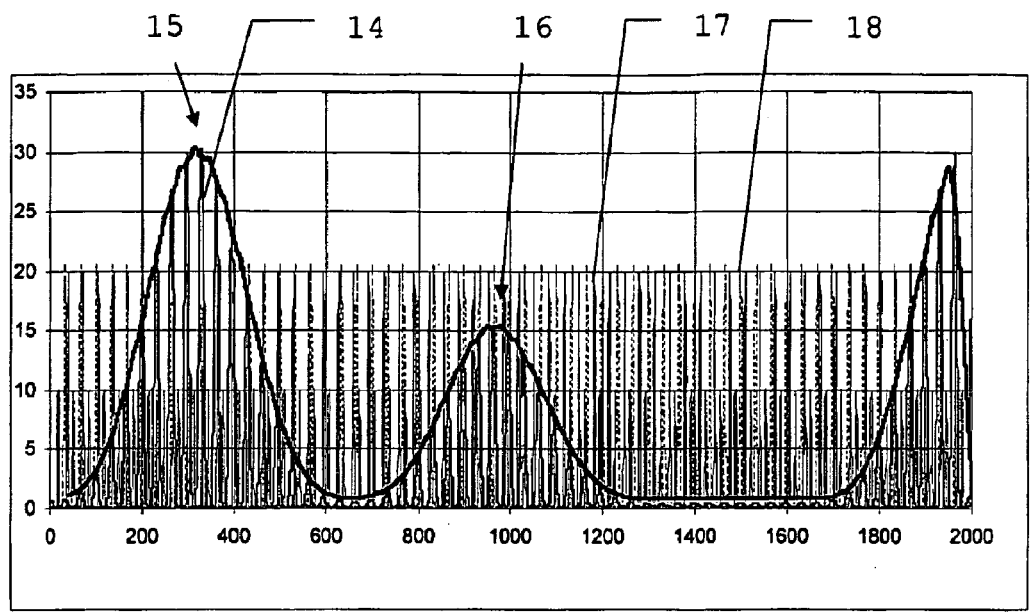
FIG. 3 shows the diagram of the signals before and after the high-frequency, heterodyne mixing.

FIG. 3 shows the diagram of the signals before and after the high-frequency, heterodyne mixing. The RF received signal 17 having the pulse period $T_i = 1/F_i$ consists of start and stop pulses and is mixed electrically and analogously by a mixer signal 18 consisting of single pulses and having a frequency shifted slightly relative to the pulse period $1/F_i$. An amplitude-modulated output signal 14 having an underlaid high-frequency carrier frequency forms at the output of the mixer. The envelope of this output signal 14 has two signal pulses; one is the time-transformed start pulse 15 and the other is coordinated with the time-transformed stop pulse 16. With the time dilation of the signals, the advantage is utilized—as in the case of a conventional phase measurement—that the signals in the low frequency range can be further processed and digitized with economical electronic components and low current consumption. In addition, the influence of the systematic transit time errors of electronic components is reduced by the time dilation factor of the mixer stage, which considerably enhances the accuracy of measurement of the apparatus.

Figure 4:
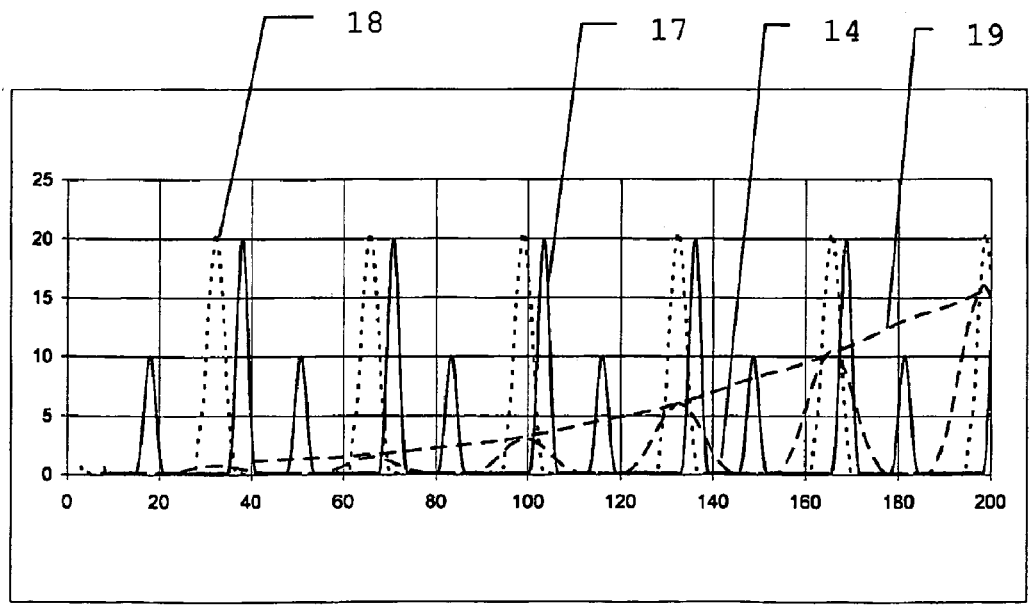
FIG. 4 shows the diagram of the signals before and after the high-frequency, heterodyne mixing, on a larger scale.

FIG. 4 shows a section of the signals from FIG. 3 in time-dilated representation. It is shown here how the stop pulse in the RF received signal 17 is not amplified and the start pulse is only partly amplified. Consequently, only the start pulse is passed to the output of the mixer and the stop pulse is lost in this phase. An output signal 14 having a comparably high frequency but with additional amplitude modulation forms at the output of the mixer. The envelope 19 of the output signal 14 is also shown.

Figure 5:
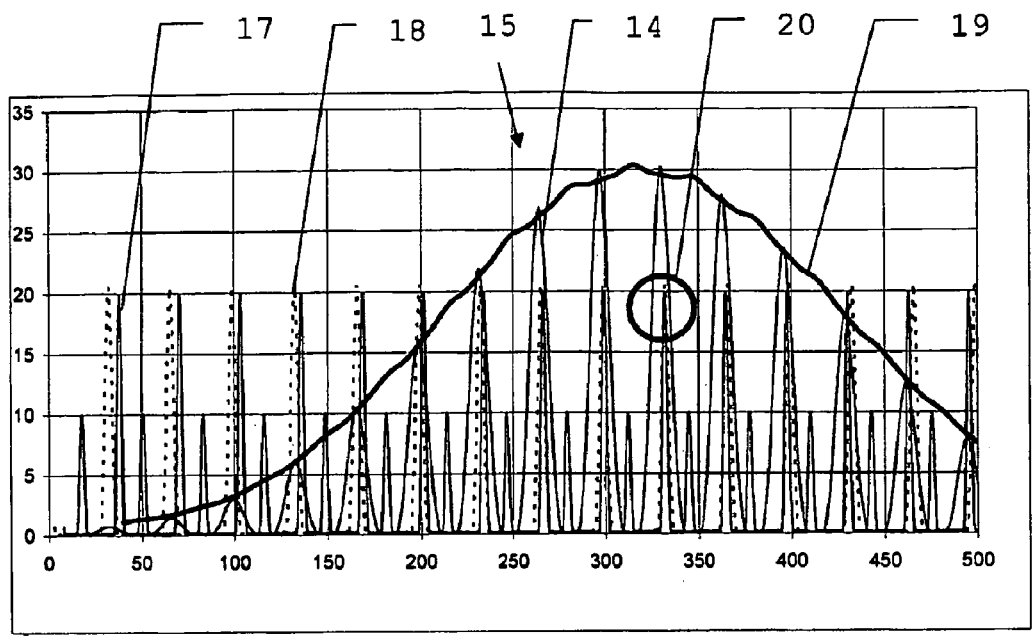
FIG. 5 shows the diagram of the signals before and after the high-frequency, heterodyne mixing, on a larger scale and showing the transformed start pulse.

FIG. 5 also shows an enlarged section from FIG. 3; in addition, the envelope 19 or the deep pass-filtered and time-dilated start pulse 15 is illustrated. In the region 20 shown by way of example, the capture of the start pulse in the received signal 17 via the mixer signal 18 and hence the onward passage to the output are evident. The time-shifted, smaller stop pulse in the received signal 17 is on the other hand not captured in this phase by the mixer signal 18 and therefore does not appear at the output of the mixer. A high-frequency, amplitude-modulated output signal 14, of which the envelope 19 describes the time-transformed start or stop signal, is passed on.

Figure 6:
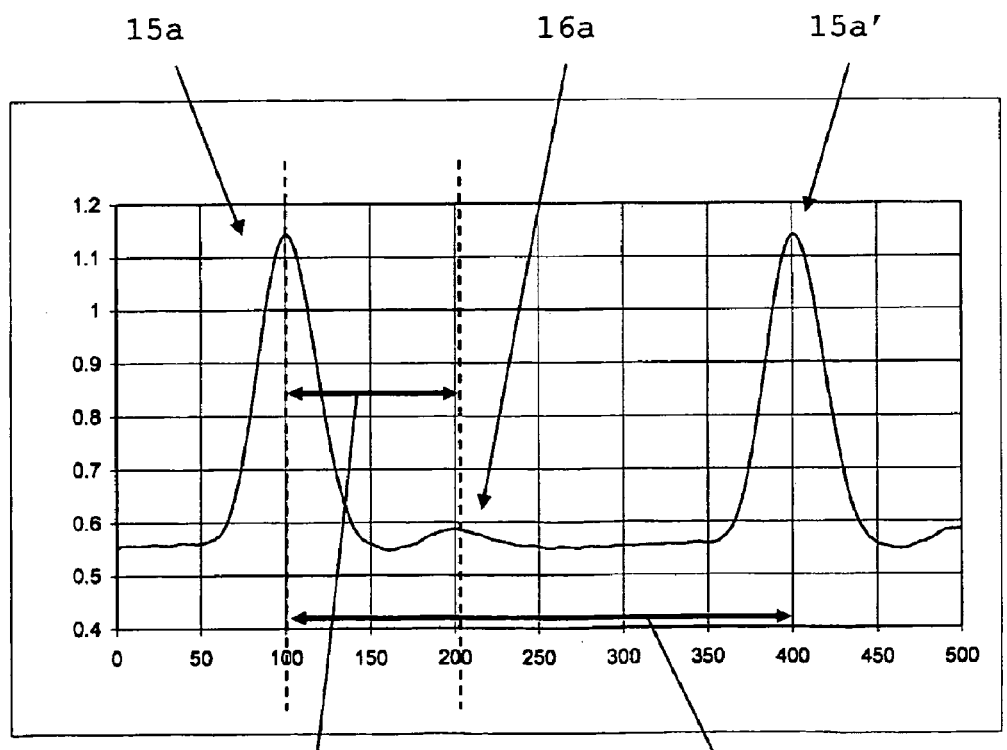
FIG. 6 shows the diagram of an LF signal pulse sequence consisting of start pulse and stop pulse.

FIG. 6 shows the diagram of the received signal transformed to the low frequency range. The period of a suitable pulse sequence comprising a first start pulse 15a and a stop pulse 16a, a second start pulse 15a' following with a time-dilated pulse interval 22 as $L_i$ also being evident in this diagram. The measured variable to be determined here is the time, i.e. the lag 21, between first start pulse 16a and the stop pulse 15b. After sampling by means of an AD converter, the lag 21 and hence the cycle $x_i$ can be calculated as the ratio between lag 21 and $T_i=L_i/c$. The calculation of the distance to the target object is carried out by means of the abovementioned relationship (5)

$$D = N_i \cdot L_i + x_i \cdot L_i$$

In the case of multiple targets, further stop pulses whose cycles $x_i$ can be measured separately at each modulation transmission frequency $F_i$ appear in addition to the first stop pulse. The possibility of being able to measure the distance to staggered target objects is a particular strength of the inventive apparatus.

Figure 7:
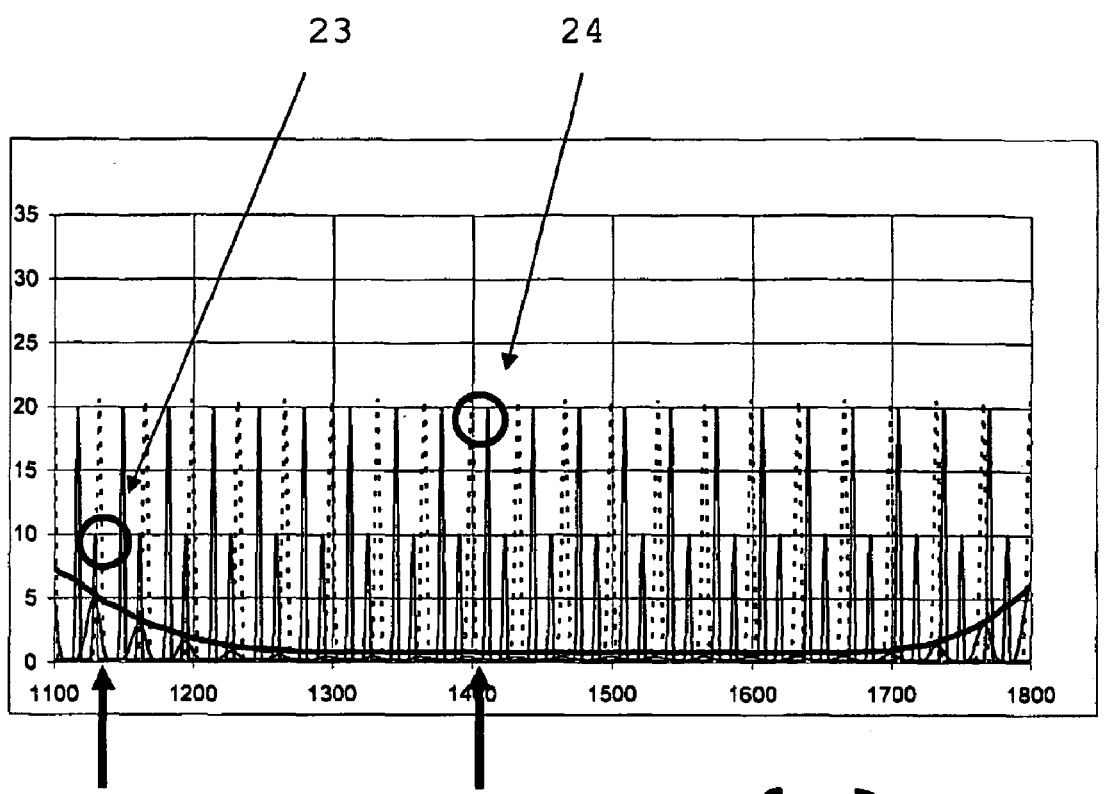
FIG. 7 shows the schematic diagram of the effect of the heterodyne subsampling.

FIG. 7 clarifies the effect of heterodyne subsampling. If the apparatus comprises only one high frequency mixer, a part of the signal energy is lost. This loss-associated effect is evident at the points 24 where the control pulse of the mixer falls between start pulse and stop pulse. In order to avoid this, a plurality of mixer modules are used in parallel side by side in the receiving channel. The phases of the control signals are shifted relative to one another by the fraction of the number of parallel mixers. This ensures that at least one of the mixers per pulse period $T_i$ carries out effective signal sampling 23 and hence no signal energy is lost. The sensitivity of such a receiving apparatus reaches that of a pulsed transit time meter and therefore differs considerably from that of a conventional phase meter.

It is self-evident to the person skilled in the art that the various arrangements of components or principles can be combined with one another in alternative or supplementary ways. Furthermore, the working examples of the apparatuses may have a heterodyne or homodyne design.

We claim:

1. A high-precision distance-measuring method comprising the steps:
   emission of pulsed electromagnetic radiation having at least one pulse repetition frequency via:
      a measuring path outside the device to at least one target to be surveyed; and
      via a reference path inside the device,
   the radiation passed via the reference path defining at least one start pulse and the radiation passed via the measuring path defining at least one stop pulse,
   reception of the radiation scattered back by the target and of the radiation passed via the reference path, the radiation scattered back by the target and the radiation passed via the reference path being detected in parallel so that the received signal has components of the radiation scattered back by the target and of the radiation passed via the reference path, and the radiation being converted into a received signal, and
   determination of at least one distance to the at least one target from the received signal,
   wherein at least two pulse repetition frequencies are chosen so that their coordinated pulse intervals do not have a common multiple in the range of the order of magnitude of the maximum external measuring path.

2. The distance-measuring method as claimed in claim 1, wherein the received signal is converted down to an output signal having a frequency lower than the pulse repetition frequency.

3. The distance-measuring method as claimed in claim 1, wherein the at least two pulse repetition frequencies are chosen within a predetermined frequency bandwidth so that, for as many combinations as possible of the coordinated pulse intervals $L_i$ and $L_j$, the condition $$|N_i \cdot L_i - N_j \cdot L_j| \geq 2 \text{ pulse width}$$

is fulfilled, $N_i$ and $N_j$ being integral positive numbers with $$|N_i \cdot L_i - N_j \cdot L_j| < \tfrac{1}{2} \cdot \min(L_i, L_j).$$

4. The distance-measuring method according to claim 1, wherein at least one pulse repetition frequency is variable and is chosen depending on the respective measured distance, so that the start pulse and stop pulse thereof neither overlap nor touch one another.

5. The distance-measuring method as claimed in claim 1, wherein a cross-correlation of at least one pulse of the low-frequency received signal with a reference signal is effected.

6. The distance-measuring method as claimed in claim 1, wherein the received signal is converted down simultaneously and in parallel with at least two mixer signals, phase shifted relative to one another, to at least two low-frequency signals.

7. The distance-measuring method as claimed in claim 6, wherein the at least two low-frequency signals are combined with the correct phase.

8. A computer program product comprising program code, which is stored on a machine-readable medium, for carrying out the method as claimed in claim 1.

9. A distance-measuring apparatus for carrying out the method as claimed in claim 1, comprising at least:
   a pulsed radiation source for producing and for emitting radiation;
   a reference path inside the device, it being possible for the radiation to be emitted simultaneously via a measuring path outside the device to at least one target to be surveyed and via the reference path inside the device;
   a receiver for receiving and for converting radiation into at least one received signal, the radiation scattered back by the target and the radiation passed via the reference path being detected together so that the received signal has components of the radiation scattered back by the target and of the radiation passed via the reference path; and
   a signal processor for processing the signals,
   wherein the radiation source is designed so that the radiation can be emitted with at least two pulse repetition frequencies, at least one of the pulse repetition frequencies being adjustable.

10. The distance-measuring apparatus as claimed in claim 9, wherein the pulse repetition frequencies are chosen so that, in the range of the order of magnitude of the maximum external measuring path, there are at least two pulse repetition frequencies whose stop pulses do not touch one another or overlap as a function of time.

11. The distance-measuring apparatus as claimed in claim 10, wherein the pulse repetition frequencies are chosen so that, for as many combinations as possible of the coordinated pulse intervals $L_i$ and $L_j$, the condition $$|N_i \cdot L_i - N_j \cdot L_j| \geq 2 \cdot \text{pulse width}$$

is fulfilled, $N_i$ and $N_j$ being integral positive numbers with $$|N_i \cdot L_i - N_j L_j| < \tfrac{1}{2} \cdot \min(L_i, L_j).$$

12. The distance-measuring apparatus as claimed in claim 9, comprising at least one mixer for converting down the received signal to a low-frequency output signal.

13. The distance-measuring apparatus as claimed in claim 12, comprising an analog mixer operating in a pulsed manner as a sub sampler for time dilation of the received signal.

14. The distance-measuring apparatus as claimed in claim 9, wherein the radiation source is a CW semiconductor laser.

15. The distance-measuring apparatus as claimed in claim 9, comprising at least two electronic signal mixers operated with different phases and connected in parallel, as a multi-channel heterodyne arrangement.

16. The distance-measuring method as claimed in claim 1, wherein the at least two pulse repetition frequencies are four pulse repetition frequencies and are chosen within a predetermined frequency bandwidth so that, for as many combinations as possible of the coordinated pulse intervals $L_i$ and $L_j$, the condition $$|N_i \cdot L_i - N_j \cdot L_j| \geq 2 \cdot \text{pulse width}$$

is fulfilled, $N_i$ and $N_j$ being integral positive numbers with $$|N_i \cdot L_i - N_j \cdot L_j| < \tfrac{1}{2} \min(L_i, L_j)$$

with $N_i, N_j < 500$.

17. The distance-measuring method as claimed in claim 1, wherein a cross-correlation of at least one pulse of the low-frequency received signal with a reference signal is effected with a synthetically produced reference signal or a reference signal stored from a preceding measurement.

18. A computer program product comprising program code, which is stored on a machine-readable medium for carrying out the method as claimed in claim 1 if the program is executed in a computer.

19. A distance-measuring apparatus for carrying out the method as claimed in claim 1, comprising:
- a pulsed radiation source for producing and for emitting radiation in the form of light light;
- a reference path inside the device, it being possible for the radiation to be emitted simultaneously via a measuring path outside the device to at least one target to be surveyed and via the reference path inside the device;
- a single for receiving and for converting radiation into at least one received signal, the radiation scattered back by the target and the radiation passed via the reference path being detected together so that the received signal has components of the radiation scattered back by the target and of the radiation passed via the reference path; and
- a signal processor for processing the signals, wherein the radiation source is designed so that the radiation can be emitted with at least two four or five pulse repetition frequencies, at least one of the pulse repetition frequencies being freely selectable.

20. The distance-measuring apparatus as claimed in claim 10, wherein the pulse repetition frequencies are chosen so that, for as many combinations as possible of the coordinated pulse intervals $L_i$ and $L_j$, the condition $$|N_i \cdot L_i - N_j \cdot L_j| \geq 2 \cdot \text{pulse width}$$

is fulfilled, $N_i$ and $N_j$ being integral positive numbers with $$|N_i \cdot L_i - N_j \cdot L_j| < \tfrac{1}{2} \min(L_i, L_j)$$

with $N_i, N_j < 500$.

21. A high-precision distance-measuring method comprising the steps:
- emission of pulsed light, having at least one pulse repetition frequency via:
  - a measuring path outside the device to at least one target to be surveyed; and
  - via a reference path inside the device;
- the light passed via the reference path defining at least one start pulse and the light passed via the measuring path defining at least one stop pulse;
- reception of the light scattered back by the target and of the light passed via the reference path, the light scattered back by the target and the light passed via the reference path being detected in parallel by a common receiver so that the received signal has components of the light scattered back by the target and of the light passed via the reference path, and the light being converted into a received signal; and
- determination of at least one distance to the at least one target from the received signal,
- wherein at least four pulse repetition frequencies are chosen so that their coordinated pulse intervals do not have a common multiple in the range of the order of magnitude of the maximum external measuring path.

* * * * *